March 23, 1943.   W. J. McDEVITT   2,314,653
REVERSIBLE VALVE
Filed Oct. 17, 1942

INVENTOR
WILLIAM JOHN McDEVITT
By Frederick C. Bromley
ATTY.

Patented Mar. 23, 1943

2,314,653

UNITED STATES PATENT OFFICE 2,314,653

REVERSIBLE VALVE

William John McDevitt, Toronto, Ontario, Canada

Application October 17, 1942, Serial No. 462,426
In Canada July 15, 1941

1 Claim. (Cl. 251—159)

My invention appertains to improvements in washers for taps and faucets, and has for its object the provision of a serviceable and durable valve of this nature especially designed for replacing the conventional washer when the same has become worn out.

The invention consists essentially of a one-piece valve comprising a circular body portion having opposite bevel faces and a tit axially extending from each face. The valve is composed of hard rubber or other suitable material moulded to required configuration, and provides a symmetrical member for reversal when the side in service becomes worn.

The double seat faces prolong the life of the valve, which has the distinctive advantage of being self aligning and supplies with light pressure a leak-proof fit.

The device is inexpensive to manufacture and easy to install.

Referring to the accompanying drawing, Figure 1 is an elevation of a tap, partly in section, showing the valve in applied position.

Figure 1:
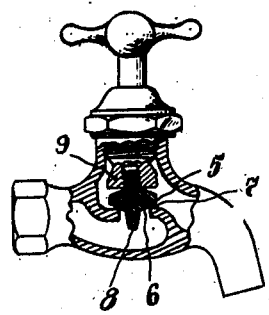
Figure 2:
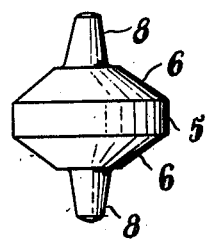
Figure 2 is a side elevation of the valve on an enlarged scale.
Figure 3:
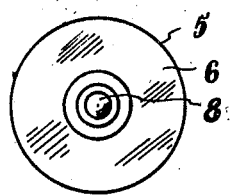
Figure 3 is a plan thereof.

The valve is desirably moulded of rubber into a one-piece member symmetrical about a plane at right angles to its axis. The body portion is indicated at 5 and is of circular shape as is common to washers. The opposite sides are desirably beveled, although they might be curved, and provide dual faces 6 for engagement with the seat 7 of a tap. An axial projection or tit 8 extends from each side and is tapered.

To install the valve it is only necessary to remove the ordinary washer and the screw that holds it in place, and to substitute the valve by inserting one of the projections 8 in the threaded hole of the stem 9. The taper of the projection wedges it in place and permits the opposite face to align itself against the seat. The distal projection forms a guide which centres the valve on the seat.

Should the face which is in service become worn it is only necessary to reverse the valve to prolong its usefulness. Prolonged life of the tap stem and body is assured by reason of the self-aligning feature, which allows the valve to conform to the seat should the same not be properly aligned. Since the valve is made in one piece of moulded material no leakage may take place through the body portion; moreover, only light pressure is required to seal it firmly on the seat. The advantageous features of the reversal construction will be appreciated by those skilled in the trade.

What I claim is:

A reversible valve for a tap stem, said valve comprising a one-piece member of moulded rubber or comparable material having a cylindrical body portion with beveled edges providing faces, either of which may be utilized as a seating surface, and having a tapered projection axially extending from each face, the taper functioning to enable either projection to be wedged in the tap stem to secure said member thereto while the other projection serves as a guide, said member being of symmetrical construction about a plane at right angles to its axis and suited to be reversed when the side in service becomes worn.

WILLIAM JOHN McDEVITT.